UNITED STATES PATENT OFFICE.

GEORGE L. SCHAEFER, OF BROOKLYN, NEW YORK, ASSIGNOR TO McKESSON & ROBBINS, OF NEW YORK, N. Y.

MEDICAL COMPOUND.

SPECIFICATION forming part of Letters Patent No. 579,898, dated March 30, 1897.

Application filed January 5, 1897. Serial No. 618,008. (Specimens.)

*To all whom it may concern:*

Be it known that I, GEORGE L. SCHAEFER, a citizen of the United States, residing at Brooklyn, in the county of Kings and State of New York, have invented certain new and useful Improvements in Chemical Compounds; and I do hereby declare the following to be a full, clear, and exact description of the invention, such as will enable others skilled in the art to which it appertains to make and use the same.

This invention relates to a new chemical compound intended more particularly for medicinal purposes; and it consists particularly in a compound wherein the chemical guaiacol forms a considerable portion and is compounded or united with an alkaloid, the compound being intended for internal application and is free from the objectionable, and practically all of the dangerous, properties of the guaiacol.

Guaiacol, as is known, is a substance sparingly soluble in water, has a characteristic odor, and very caustic properties. The objectionable odor and caustic effects have heretofore limited the use of the substance as a medicine to small or insignificant amounts or doses. To obviate and overcome these objections to the substance guaiacol and to render the same susceptible of being administered in large amounts, I form a union of guaiacol and sulfuric acid, which compound possesses the following chemical formula:

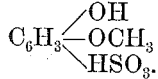

The compound so formed I term "guaiacol sulfonic acid." The material is prepared by heating guaiacol with concentrated sulfuric acid on a water-bath, diluting the product with water, and then neutralizing the mixture with a carbonate or hydrate, such as barium, calcium, or potassium carbonate or hydrate, whereby barium, calcium, or potassium guaiacol sulfonate is formed. These salts are soluble in water and may be purified by recrystallization, and from the purified salts guaiacol sulfonic acid is obtained by the addition of sulfuric or other mineral acid. (It can also be obtained by decomposition of the metal salts with sulfureted hydrogen.)

Guaiacol sulfonic acid possesses the characteristic medicinal properties, but is free from the caustic effects or odor of guaiacol. In order to render the same susceptible of being administered in considerable quantity, I have formed a substance wherein the same is compounded with and neutralized by an alkaloid. This compound can be produced either by double decomposition or by diluting the acid and dissolving the alkaloid therein. The compound thus produced I have found to be free from the objectionable odor and caustic properties of guaiacol and has proven a very valuable and powerful medicine or remedy, possessing the valued properties of both guaiacol and the alkaloid.

The alkaloid which I preferably employ is quinine, making either the neutral or acid salt of the guaiacol sulfonic acid.

The alkaloid of quinin to produce a neutral salt is mixed with the guaiacol sulfonic acid in about the proportions of two hundred and four (204) parts of the acid to three hundred and twenty-four (324) parts of the alkaloid by weight. This compound, which is termed "guaiacol sulfonate of quinin," possesses the following chemical formula:

The acid salt of quinin is made with the guaiacol sulfonic acid in about the proportion of four hundred and eight (408) parts of the acid to three hundred and twenty-four (324) parts of the alkaloid. This compound is termed "guaiacol bisulfonate of quinin," and possesses the following chemical formula:

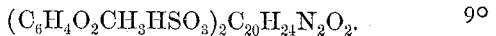

Guaiacol sulfonate of quinin is a neutral salt sparingly soluble in cold water, soluble in boiling water, and readily soluble in alcohol and diluted acids.

Guaiacol bisulfonate of quinin is an acid salt very soluble in cold water and alcohol and possessing hygroscopic properties.

In these compounds the odors and caustic properties of guaiacol, as stated, are eliminated, and they possess both the antipyretic properties of quinine and the antiseptic and antifebrile properties of guaiacol, and admit of the administration of guaiacol in quantities much larger than has heretofore been possible. I have also found that similar compounds can be prepared from union of guaiacol sulfonic acid with cinchonidia, cinchonin, and quinidin, which possess similar chemical and medicinal properties. These and the foregoing quinin salts may be prepared either directly from the dilute guaiacol sulfonic acid by dissolving the various alkaloids therein or by double decomposition between a salt of the alkaloid, such as the sulfate, and either calcium, barium, or potassium guaiacol sulfonate. The solutions are evaporated over a water-bath or *in vacuo* and yield the salts above described.

While I have specified certain alkaloids, I desire it understood that the invention is not limited to such, as other alkaloids or bases may be used with beneficial effect. I also desire it understood that the stated proportions may be varied.

Having thus described the invention, what I claim as new, and desire to secure by Letters Patent, is—

1. A chemical compound being a salt, comprising an alkaloid base such as quinin and guaiacol sulfonic acid.

2. A chemical compound being a salt, comprising quinin and guaiacol sulfonic acid.

In testimony whereof I affix my signature in presence of two witnesses.

GEORGE L. SCHAEFER.

Witnesses:
WILH. SCHAD,
EMIL LACCORN.